United States Patent Office.

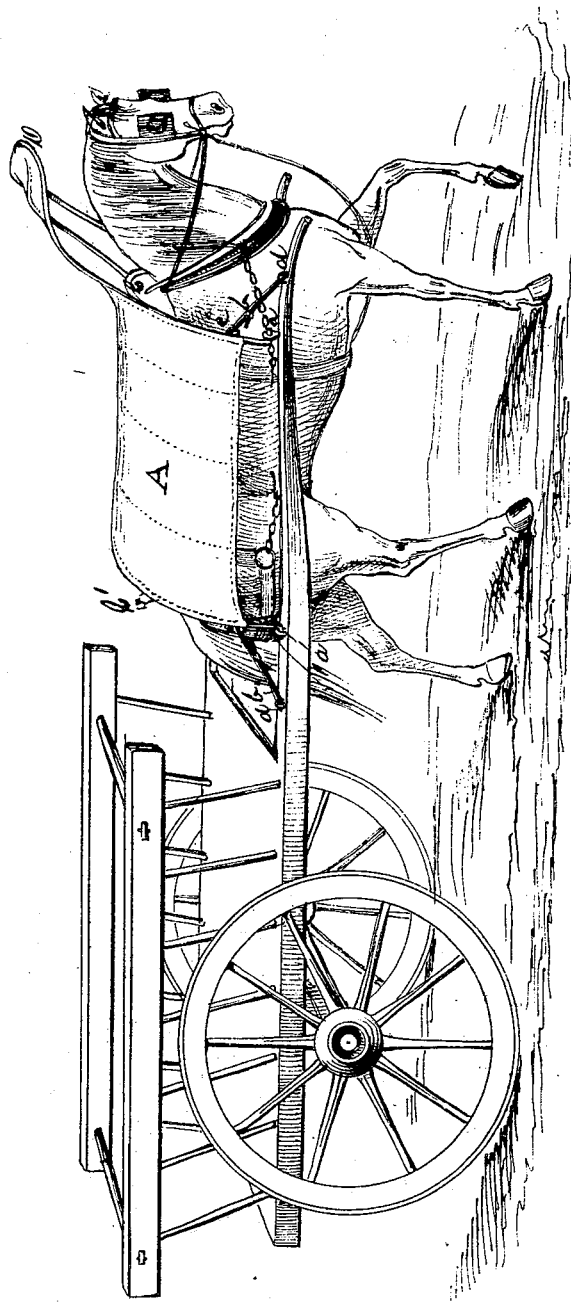

WILLIAM McCORMICK, OF PHILADELPHIA, PENNSYLVANIA.

Letters Patent No. 109,532, dated November 22, 1870.

IMPROVEMENT IN AWNINGS FOR HORSES.

The Schedule referred to in these Letters Patent and making part of the same.

*To all whom it may concern:*

Be it known that I, WILLIAM McCORMICK, of the city and county of Philadelphia and State of Pennsylvania, have invented a new and useful improved Canopy for Horses; and I do hereby declare the following to be a full, clear, and exact description thereof, sufficient to enable others skilled in the arts to make and use the same, reference being had to the accompanying drawing making part of this specification, in which the figure is a perspective view of my improved device attached to the shafts of a vehicle.

My present invention has for its object the production of a canopy or shield which will effectually protect horses and other draft animals attached to carts and other vehicles, from the sun's rays, and, at the same time, will permit a free circulation of air beneath the shield or canopy, and to this end, It consists in securing the canopy or shield upon a suitable frame, which is attached to the shafts of the vehicle, all of which will be hereinafter more fully set forth.

In the drawing—

A may represent the canopy or shield, which consists of cotton fabric or any other suitable material best adapted to accomplish the object herein sought. This canopy or shield is of such a length and breadth as to shade and protect the entire body and head of the animal from the oppressive heat, or from rain and snow.

A space is left between the canopy or shield and the animal, which permits a free circulation of air, and thus in summer keeps the animal cool.

The frame supporting the canopy or shield A is made of suitable metal or wood, and consists of the bows C C', the former attached to the shafts at or about the shoulders, the latter upon said shafts near the rear portion of the animal, both being united together by a suitable brace at or about their centers, so as to strengthen the bows and at the same time prevent the canopy or shield from sagging and interfering with the perfect circulation between the animal and the said canopy or shield.

To the front bow C is attached or formed, with an extended frame, D, made of suitable material, preferably of spring-steel, which extends upwardly over the neck and head of the animal in such a manner that the said frame does not interfere with the movement up and down of the animal's head.

This frame D may also be formed or provided with a brace at or near its center, so as to strengthen it and prevent the canopy or shield from sagging at this point and interfering with the free circulation of air between the animal and the protector or shield.

The bows C C' are bent at each end in opposite direction to each other, so as to engage and interlock with eyes or suitable fastenings *a a*, upon the shafts of the dray, cart, or other vehicle, by which means the canopy is secured in position in a substantial manner, being readily attached or detached.

To further retain the frame securely in place while the vehicle is in motion, I connect and brace the front and rear bows C C' to the shafts by means of hooks or straps *b b*.

These hooks or straps are secured at one end to the fastenings *c c*, attached or formed with the bows C C', the other end engaging with eyes or suitable fastenings *d d*, upon the shaft of the vehicle.

Thus it will be seen that I have produced a canopy or shield for horses and other animals which, when applied to the shafts of the vehicle, will effectually protect the animal from the rays of the sun, and from rain and snow, and at the same time a space sufficient is left underneath the canopy for a free circulation of air.

Having thus described my invention,

What I claim is—

The bows C C', with the extension D and covering A, mounted upon the shafts of a vehicle, and secured in position by the braces or straps *b b*, the whole constructed and combined substantially as and for the purpose set forth.

To the above I have signed my name this 24th day of August, 1870.

WILLIAM McCORMICK.

Witnesses:
JAMES L. NORRIS,
W. H. FINCKEL.